UNITED STATES PATENT OFFICE.

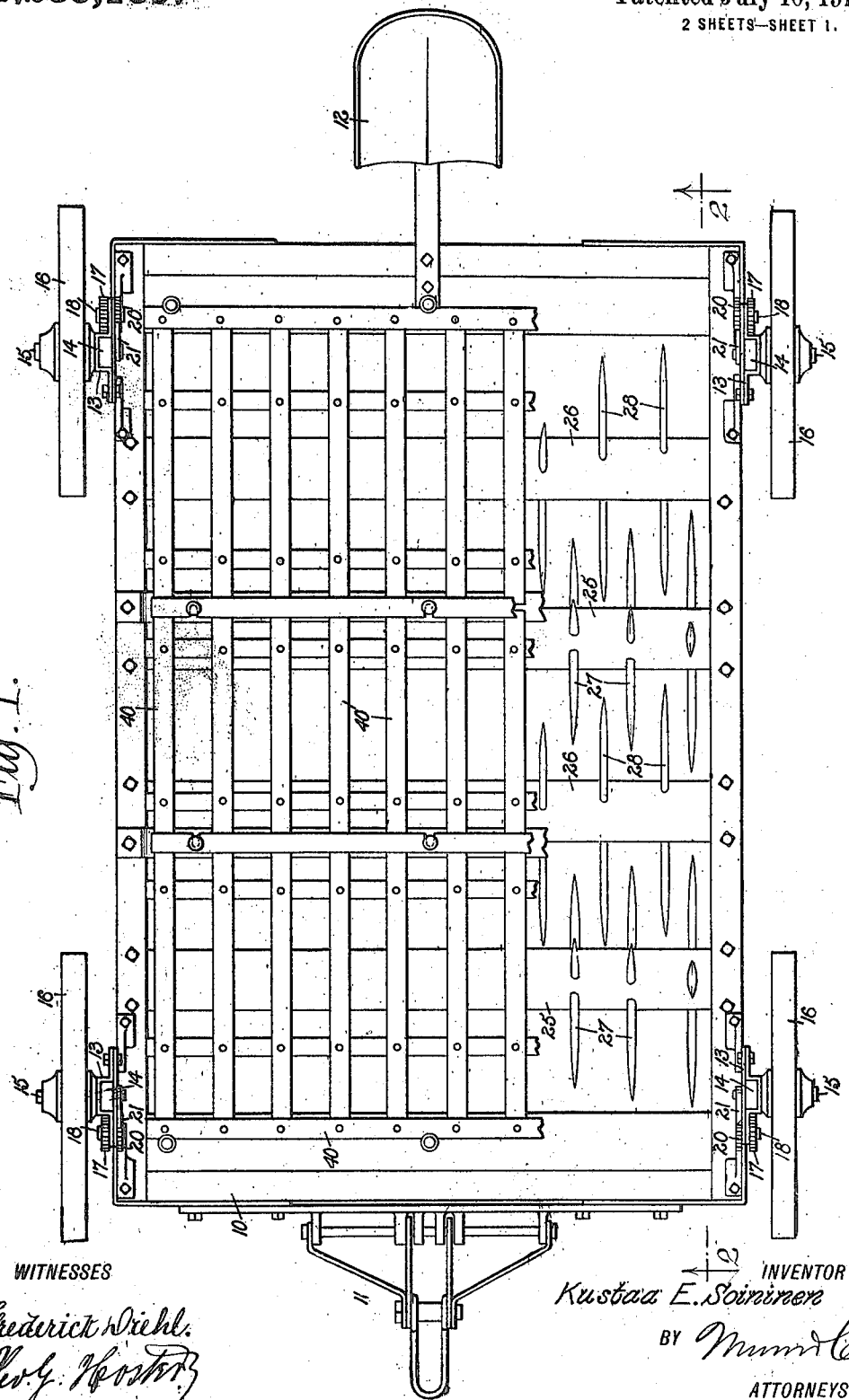

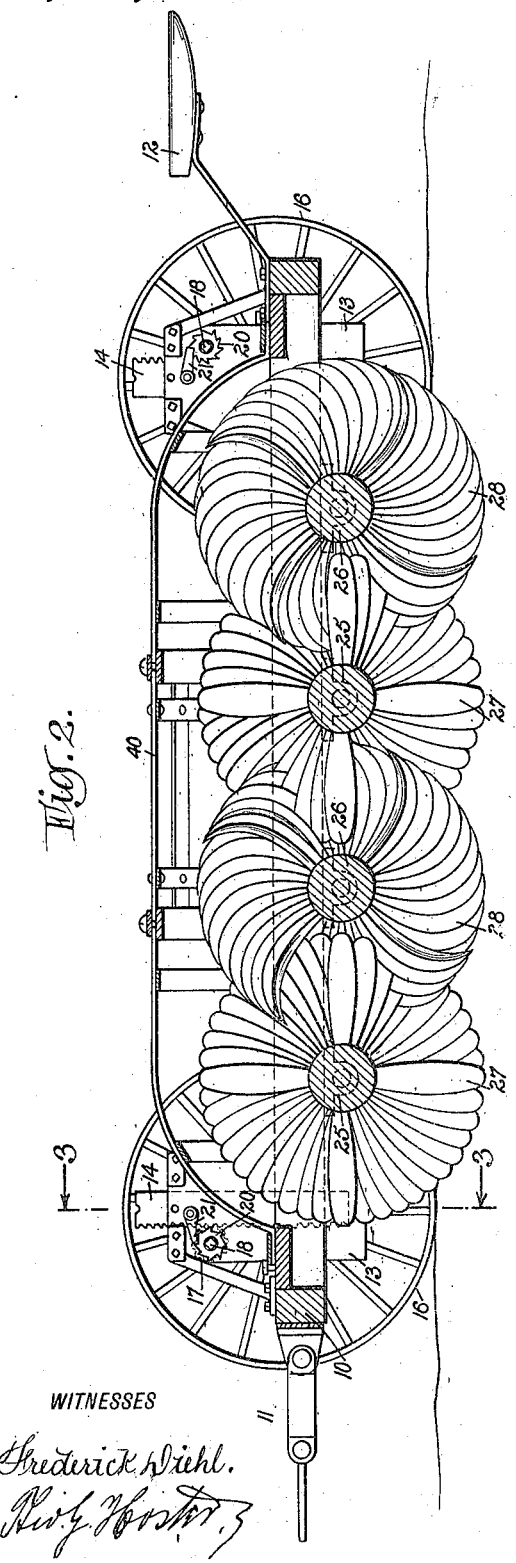

KUSTAA E. SOININEN, OF BROOKLYN, NEW YORK, ASSIGNOR OF ONE-THIRD TO MATHIAS EDWARD JUOPPERI, OF BROOKLYN, NEW YORK.

HARROW.

1,233,139.  Specification of Letters Patent.  Patented July 10, 1917.

Application filed February 3, 1917. Serial No. 146,379.

*To all whom it may concern:*

Be it known that I, KUSTAA E. SOININEN, a citizen of Finland, and a resident of the city of New York, borough of Brooklyn, in the county of Kings and State of New York, have invented a new and Improved Harrow, of which the following is a full, clear, and exact description.

The object of the invention is to provide a new and improved harrow more especially designed for harrowing freshly plowed up sod or prairie soil and for harrowing the ground for a second crop without first resorting to plowing, and arranged to insure a thorough preparation of the soil to any desired depth with a view of producing a bed ready for receiving seed and irrespective of whether the soil is hard or soft, wet or dry.

In order to accomplish the desired result, use is made of a wheeled frame adapted to be drawn over the field, and transverse rollers journaled in the said frame one behind the other, and of which one is provided with spirally arranged flat cutting blades extending radially and having their width in the direction of the movement of the harrow, the other roller being provided with spirally arranged sickle or claw-shaped cutting blades alternating the blades of the first roller.

A practical embodiment of the invention is represented in the accompanying drawings forming a part of this specification, in which similar characters of reference indicate corresponding parts in all the views.

Figure 1 is a plan view of the harrow with part of the guard broken out;

Fig. 2 is a sectional side elevation of the same, on the line 2—2 of Fig. 1;

Fig. 3 is an enlarged transverse section of the mechanism for raising and lowering the frame and its rollers, the section being on the line 3—3 of Fig. 2;

Fig. 4 is a perspective view of one of the straight cutting blades; and

Fig. 5 is a similar view of one of the claw-shaped cutting blades.

The frame 10 of the harrow is preferably of rectangular shape and is provided at its front end with the usual driving means 11 for connection with a team or other means used for drawing the harrow over the field. The rear end of the frame 10 is provided with a suitable seat 12 for accommodating the driver of the harrow. The sides of the frame 10 are provided near the front and rear with vertically disposed guideways 13 in which are mounted to slide up and down racks 14 provided with outwardly extending stub axles 15 on which are journaled wheels 16 adapted to travel over the ground. Each of the racks 14 is in mesh with a pinion 17 secured on the shaft 10 journaled in suitable bearings arranged on the corresponding guideways 13, and the inner end of the shaft 18 is preferably made polygonal for the application of a wrench or other tool 19 to permit of conveniently turning the shaft 18 and consequently the pinion 17 to raise or to lower the rack 14 and with it the wheel 16. On the shaft 18 is secured a ratchet wheel 20 engaged by a pawl 21 fulcrumed on the corresponding guideway 13 to hold the shaft 18 against return movement after the desired adjustment has been made.

On the frame 10 are journaled transverse rollers 25 and 26 arranged one behind the other and repeated in alternate relation as many times as desired. Preferably, however, four such rollers are used, as shown in the drawings. Each of the rollers 25 is provided with spirally arranged flat cutting blades 27 of uniform length and disposed radially, with the width of the blades extending in the direction of the travel of the harrow.

The blades 27 are spaced equal distances apart in each spiral but the corresponding blades of the several spiral rows are disposed in the same planes spaced equal distances apart, as will be readily understood by reference to Fig. 1. By the arrangement described, a large number of blades 27 can be accommodated on the roller 25. The roller 26 is provided with blades 28 arranged in spiral rows on the roller and made claw or sickle-shaped and of uniform length to correspond to the length of the blades 27 so that both sets of blades 27 and 28 cut into the soil to the same depth, and the latter is varied by the adjustment of the wheels 16 according to the nature of the soil harrowed at the time. Each of the blades 28 terminates in a point and its width extends in the direction of the movement of the harrow with the cutting edges at both the front and rear edges. The cutting blades are arranged on the roller 26 in approximately the same relation as the cutting blades 27 are on the roller 25, but the blades 28 alternate with the blades 27, as will be readily understood by reference to Fig. 1. It will be noticed that the blades 27 clear the roller 26 and the blades 28 clear the roller 25, thus accommodating a large number of rollers and cutting blades in a comparatively small space.

When the harrow is drawn over the field the blades 27 and 28 cut into the ground to a predetermined depth, that is, according to the position of the wheels 16 on the frame 10. As the roller advances each cutting blade 27 and 28 cuts a long slit into the soil and as the cutting blades 27 and 28 are closely spaced in a transverse direction it is evident that the soil is cut up into very small pieces thus providing a proper bed for receiving the seed. The pointed sickle or claw-shaped cutting blades 28 in addition to cutting the soil dig into the latter and loosen it, and as the cutting blades 28 follow the cutting blades 27, it is evident that the soil is thoroughly loosened as it is already cut by the blades 27. In practice, the soil is cut practically into inch pieces.

It is understood that the harrow shown and described is more especially designed for harrowing plowed up prairie soil or sod or soil from which the first crop has been harvested without requiring a plowing preparatory to seeding for a second crop but in each case the sod or soil is cut up sufficiently fine for receiving the seed.

When it is desired to move the harrow from one place to another, the frame 10 is raised relative to the wheels 16 for the terminals of the cutting blades 27 and 28 to clear the ground thus avoiding injury to the said blades.

In order to prevent injury to the attendant the frame 10 is provided on top with a skeleton guard 40 extending over the rollers and their cutting blades.

Having thus described my invention, I claim as new and desire to secure by Letters Patent:—

1. In a harrow, a wheeled frame adapted to be drawn over the field, and transverse rollers journaled in the said frame one behind the other in pairs and of which pairs one is provided with spirally arranged flat cutting blades extending radially and having their width in the direction of the movement of the harrow, the other roller of the pair being provided with spirally arranged sickle-shaped cutting blades alternating with the blades of the first roller of such pair.

2. In a harrow, a wheeled frame adapted to be drawn over the field, and transverse rollers journaled in pairs in the said frame one roller behind the other and of which one is provided with spirally arranged straight flat cutting blades having rounded outer ends and extending radially and having their width in the direction of the movement of the harrow, the other roller of the pair being provided with spirally arranged sickle-shaped cutting blades alternating with the blades of the first roller, each of the said sickle-shaped blades terminating in a point and having front and rear cutting edges and overlapping the straight blades of the adjacent roller in close relation.

KUSTAA E. SOININEN.